Dec. 19, 1961 M. T. SAVINO 3,013,551
CHARCOAL COOKING GRILL IGNITING MEANS
Filed Aug. 21, 1959
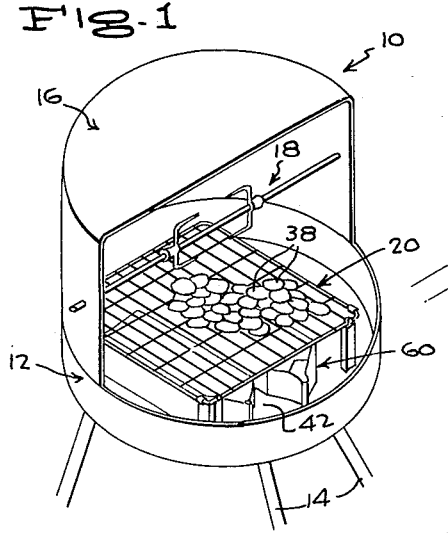
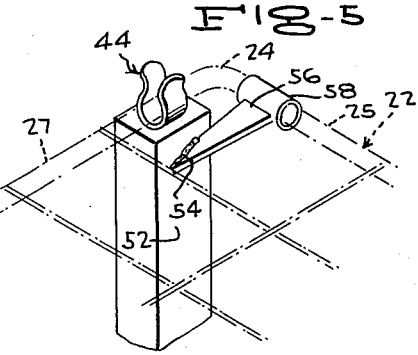
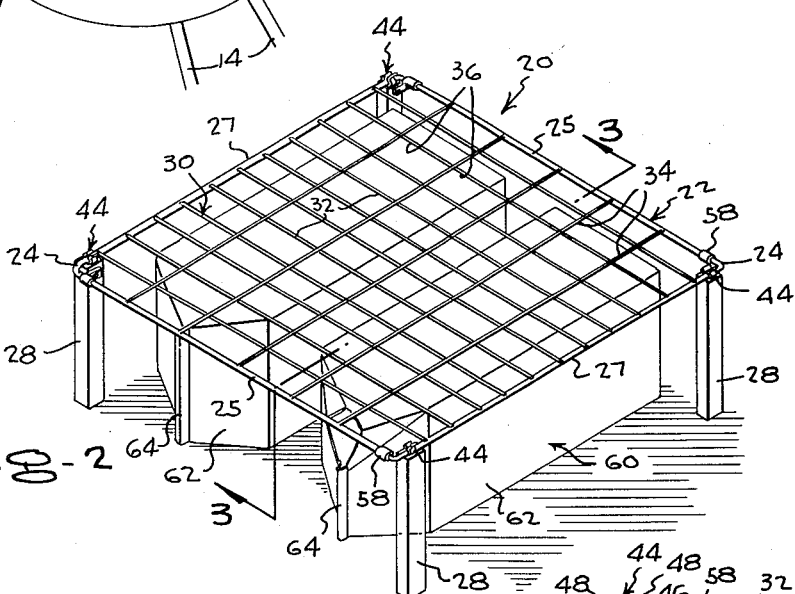
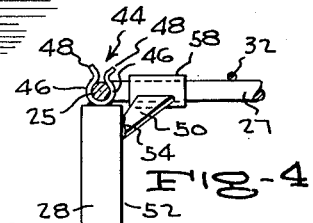
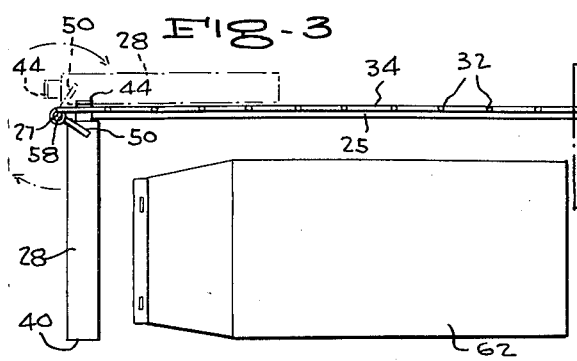
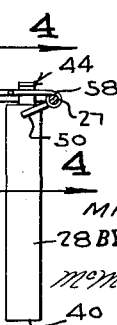
INVENTOR.
MICHAEL T. SAVINO
BY
McMorrow, Berman & Davidson
ATTORNEYS

United States Patent Office 3,013,551
Patented Dec. 19, 1961

3,013,551
CHARCOAL COOKING GRILL IGNITING MEANS
Michael T. Savino, Honolulu, Hawaii
(2311 Monroe Ave., Orange, Calif.)
Filed Aug. 21, 1959, Ser. No. 835,241
3 Claims. (Cl. 126—29)

This invention relates to improvements in igniting means for charcoal cooking grills, and more particularly to a novel charcoal-supporting grid, to be positioned in the pit of such as an outdoor barbecue grill, for supporting charcoal briquets while being ignited, the grid being removable from the pit to deposit the ignited charcoal in the pit, and to novel charcoal igniting material to be used in the pit in conjunction with the grid.

The primary object of the invention is to provide convenient and efficient igniting means of the character indicated above which enables easily and quickly igniting charcoal in a grill, without resort to less readily available, less convenient, and more expensive igniting means.

Another object of the invention is to provide a simple, inexpensive, and rugged grid of the character indicated above, which is securely supported and braced while in use, and is readily foldable for storage.

A further object of the invention is to provide, in conjunction with a grid of the kind indicated above efficient igniting material, which is less expensive than store-bought material of this kind, and which is more readily available in most homes, suitable material on this order being waxed paperboard, which is ordinarily thrown out or otherwise disposed of, such as empty milk and similar cartons. In this connection, a secondary object of the invention is to provide, for the convenience to grill users and to the profit of carton manufacturers, the practical prospect of merchandising packages of cartons, either full or empty, containing as a bonus an igniting grid of the invention, thereby promoting the sale of the cartons and their contents.

Other important objects and advantageous features of the invention will be apparent from the following description and the accompanying drawings, wherein, for purposes of illustration only, a specific form of the invention is set forth in detail.

In the drawings:

FIGURE 1 is a perspective view of a barbecue grill having a pit in which is disposed an igniting grid of the invention, with igniting means of the invention in the pit beneath the grid, and charcoal briquets supported on the grid for ignition;

FIGURE 2 is an enlarged perspective view of said grid and igniting material;

FIGURE 3 is a vertical section taken on the line 3—3 of FIGURE 2, showing grid legs folded down and locked in operative position in full lines, and a leg folded up to collapsed position in phantom lines;

FIGURE 4 is a fragmentary vertical section taken on the line 4—4 of FIGURE 3; and FIGURE 5 is a fragmentary perspective view, on a further enlarged scale, of the grid, the grid frame being shown in phantom lines, with a leg thereof releasably locked to a side member of the frame.

Referring in detail to the drawings, wherein like numerals designate like parts throughout the several views, the numeral 10 generally designates a substantially conventional form of outdoor barbecue grill, comprising a shallow circular pan-shaped pit 12, supported on legs 14, and surmounted by a hood 16, across which is journaled a rotary spit 18. Shown removably seated in the pit 12, is an igniting grid of the invention, generally designated 20.

The igniting grid 20, which can be of circular form if desired, preferably comprises an open rectangular frame 22, such as steel, having rounded corners 24 connecting its side members 25, 25 and end members 27, the frame 22 being dimensioned according to the size or diameter of the grill pit 12, to be easily put in and taken out of the pit 12, by suitable means, such as a metal hook or other available implement, the cooking grid (not shown) of the grill 10 first having been removed from the pit 12.

The igniting grid 20 further comprises vertically elongated metal legs 28, of either rectangular or round cross section, and of a height to support the frame 22 in the region of the upper edge of the pit 12, and to allow sufficient space below the frame 22 for accommodating the igniting material described hereinafter. Extending across the grid frame 22 is a metal mesh platform 30, preferably composed of crossed and intersecting longitudinal wires or rods 32 fixed to the end members 27, and transverse wires or rods 34, secured to the side members 25, the rods being spaced from each other to define longitudinally elongated openings or mesh 36, too small in size to permit charcoal briquets 38 or the like to fall through the platform 30, but large enough to provide for unimpeded contact with the briquets of flame from the igniting material beneath the platform, and to permit of easy cleaning of the platform.

The legs 28 preferably having squared flat lower ends 40, to bear solidly and stably upon the pit bottom 42, and upwardly opening, upstanding spring clips 44 are centrally fixed on the upper ends of the legs. The clips 44 preferably have opposed and arcuate arms 46 which terminate at their upper ends in divergent lips 48, which facilitate forcible entrance of frame side members into the clips 44 and retention thereof, as shown in FIGURES 4 and 5.

The legs 28 are braced relative to the frame 22 and hinged thereon, against loss or displacement and to enable the legs to be folded or collapsed upwardly, onto the upper side of the platform 30, for compact storage when not in use, by means of flat tapered arms 50, which are horizontally disposed at the laterally inward sides 52 of the legs and are fixed thereto, at the smaller or narrower ends, as by welding 54. The arms 50 have fixed on their larger or wider ends, as indicated at 56, transverse hinge sleeves 58, which rotatably embrace related frame side members at points adjacent to related frame corners 24. In the illustrated form of the invention, the sleeves 58 are journaled on the longitudinal frame side members 25, with the related leg-locking spring clips 44 engaged with end members 27.

The illustrated igniting material, generally designated 60 comprises a plurality of wax-impregnated paper board elements, preferably in the form of emptied milk or fruit juice cartons 62, having openable pouring spouts 64 at one end thereof, which are opened to facilitate combustion thereof. Such cartons, when empty, are usually thrown away or otherwise disposed of, so that their use for the present purpose costs the user nothing. Further, the use of such cartons as igniting material opens the way to their being merchandised, as mentioned above. Half-gallon cartons 62 are preferable for their longer burning capacity than smaller cartons, but smaller or larger cartons can be used, the cartons being laid on their sides in the barbecue grill pit bottom 42, beneath the platform 30 of the igniting grid, as shown in FIGURES 2 and 3. A single match is ordinarily sufficient to light the cartons to produce flaming fire sufficient to ignite a substantial batch of charcoal briquets 38 deposited, in a layer, upon the platform 30, in a relatively few minutes. When the charcoal has become ignited, the igniting grid 20 is simply tilted to deposit the ignited charcoal into the pit 12, whereupon the grid 20 is lifted out of the pit 12 and put to one side, and the original cooking grill (not shown) is replaced in the pit over the ignited charcoal, and the food to be cooked is then placed upon the original grill.

Although there have been shown and described herein preferred forms of the invention, it is to be understood that the invention is not necessarily confined thereto, and that any change or changes in the structures of and in the relative arrangements of components thereof are contemplated as being within the scope of the invention as defined by the claims appended hereto.

What is claimed is:

1. A charcoal igniting grid for the pit of a barbecue grill, comprising a horizontal frame having longitudinal side members and transverse end members, normally depending erect legs having lower ends to rest upon a pit bottom, said legs having upper ends, an upstanding spring clip on the upper end of each leg to embrace an adjoining end frame member in the erect position of the legs, and a horizontal sleeve adjacent the upper end of each leg, each sleeve being journaled on an adjoining side frame member.

2. A charcoal igniitng grill comprising a rigid frame having opposed side and end members, an open mesh platform secured across the frame, legs disposed at the meetings of the side and end frame members, said legs having upper ends, an upstanding spring clip on the upper end of each leg, an arm fixed to and extending laterally from each of said legs, a sleeve fixed on said arm, each sleeve being journaled on an adjoining side frame member, each leg being swingable from a horizontal position along the frame to an erect position wherein each said clip is engageable with an adjoining end frame member to hold each leg in an erect position.

3. A charcoal igniting grill comprising a rigid rectangular frame having side members and end members, an open mesh platform secured across the frame, legs disposed at the side and end frame members, an arm fixed to and extending laterally from each side leg, a sleeve fixed on said arm, each sleeve being journaled on an adjoining side frame member, and an upstanding spring clip on the upper end of each said leg releasably engageable with an adjoining end frame member.

References Cited in the file of this patent

UNITED STATES PATENTS

| | | |
|---|---|---|
| 1,054,188 | Ehmann | Feb. 25, 1913 |
| 1,569,863 | Lawless | Jan. 19, 1926 |
| 2,148,439 | Crawford | Feb. 28, 1939 |
| 2,631,579 | Metzger | Mar. 17, 1953 |
| 2,768,044 | Jaffe | Oct. 23, 1956 |
| 2,841,683 | Ogle et al. | July 1, 1958 |
| 2,922,683 | Schmertz | Jan. 26, 1960 |
| 2,939,773 | Rymer | June 7, 1960 |

FOREIGN PATENTS

| | | |
|---|---|---|
| 679,662 | Germany | Aug. 10, 1939 |
| 1,111 | Great Britain | Apr. 10, 1869 AD |

OTHER REFERENCES

Article entitled "Facts About Fire Building," published by "Fritos" (pages 4 and 5 relied on).